May 2, 1933. W. O. HEYNE ET AL 1,906,857
ELECTRICAL CONDENSER
Filed Aug. 12, 1931
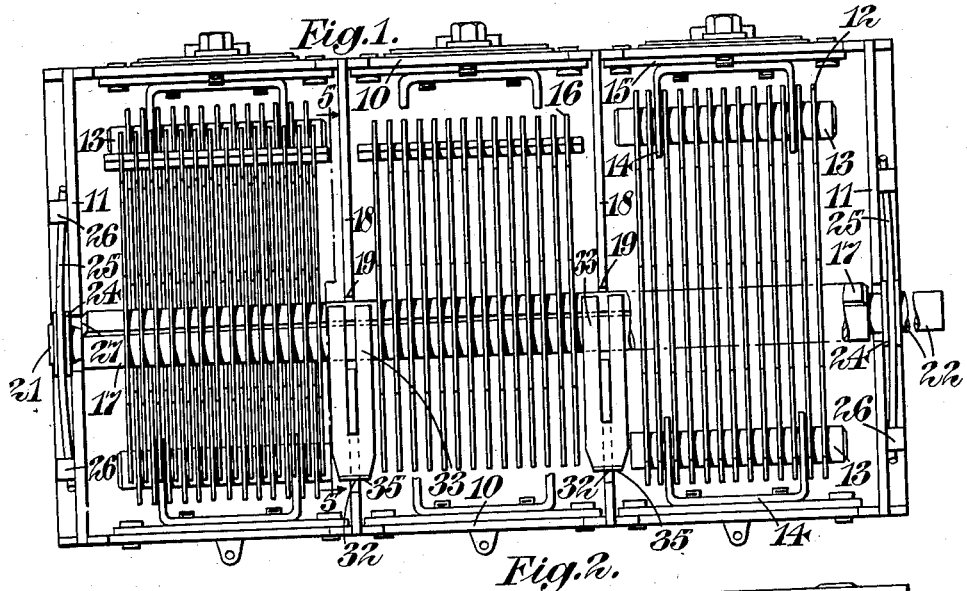
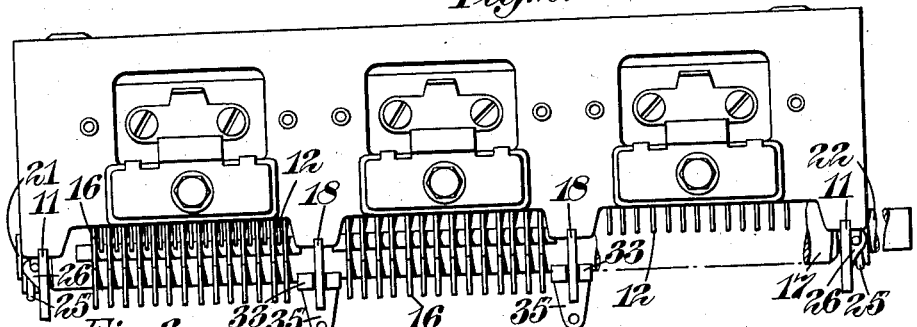
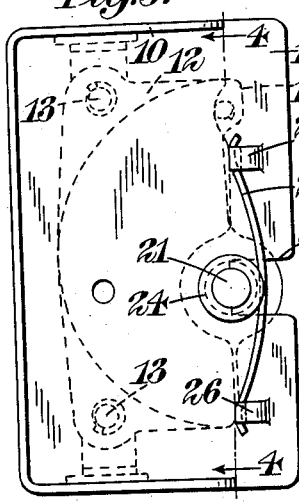
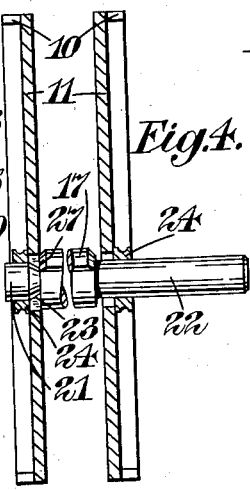
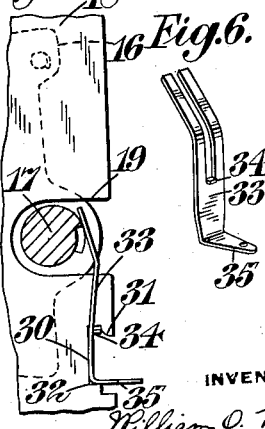
INVENTORS
William O. Heyne &
Percival J. Packman
by their attorneys
Byrnes, Stebbins, Parmelee & Blenko Patented May 2, 1933

1,906,857

UNITED STATES PATENT OFFICE

WILLIAM OSCAR HEYNE, OF ILFORD, AND PERCIVAL JAMES PACKMAN, OF SEVEN KINGS, ENGLAND, ASSIGNORS TO THE PLESSEY COMPANY LIMITED, OF ILFORD, ESSEX, ENGLAND, A BRITISH COMPANY

ELECTRICAL CONDENSER

Application filed August 12, 1931, Serial No. 556,478, and in Great Britain May 29, 1931.

This invention is for improvements in or relating to electrical condensers of the moving-vane type and principally concerns the manner of locating in such condensers the moving-vane spindle in its framework bearings and, therefore, the moving-vanes in their proper interposition between the fixed vanes.

According to the present invention, a variable electrical condenser comprises a movable vane spindle carried in bearings in a frame member, characterized by a fixed bearing and a resilient retainer to urge the spindle against the fixed bearing in a direction transverse to the length of the spindle.

The bearing may be formed with a surface to engage the spindle over an angle of not more than 180°.

In one form of the invention, the spindle is formed with a tapered (e. g. conical) surface co-operating with a corresponding surface afforded by the fixed part of the bearing whereby the retainer urges the spindle in a longitudinal direction.

A thrust surface may be provided either at the same or another bearing as the tapered surface, which is pressed by said longitudinal force into engagement with a corresponding thrust surface on the fixed part of the bearing.

The invention is more particularly concerned with an improved construction of condenser adapted to the requirements of manufacture on mass production lines.

To this end, in one form of the invention, an improved condenser comprises a framework having opposed end-members of sheet-metal connected together by longitudinal frame members. The moving-vane spindle is supported at its two ends in U-shaped notches provided to receive it in the upper edge of the said end-members of the framework.

In order that the invention may be more readily understood, a specific example thereof will now be described with reference to the accompanying drawing, in which—

Figure 1 is an elevation of a gang condenser in accordance with the invention,

Figure 2 is a plan view of Figure 1,

Figure 3 is a side elevation viewed from the left of Figure 1,

Figure 4 is a section on the line 4—4 of Figure 3 of the two end bearings,

Figure 5 is a section on the line 5—5 of Figure 1, and

Figure 6 is a perspective view of a contact brush.

Like reference numerals indicate like parts throughout the drawing.

As shown in Figure 1, the condenser consists of three ganged units for simultaneous operation. In Figures 1 and 2 for clearness the fixed plates are shown removed from the middle unit and the moving plates removed from the right hand unit. The condenser is built up in a simple frame of sheet metal comprising a side wall 10 bent to the form of three sides of a rectangle and two end walls 11 and two partitions 18 of rectangular shape secured in it and constituting respectively the ends of the frame and the dividing walls between adjacent units of the condenser. The fixed plates 12 are carried by supporting members 13 mounted on brackets 14 fixed through insulating plates 15 to opposite side walls 10.

The moving plates 16 are carried on a single spindle 17 extending the whole length of the condenser. The partitions 18 are formed as shown in Figure 5 with U-shaped notches 19 to allow the spindle to pass freely through them. The end walls 11, as shown in Figure 3, have somewhat smaller U-shaped notches 20 shaped to afford bearings for the spindle 17. The spindle is a solid extruded rod of brass and has portions 21, 22 of reduced diameter where it passes through its bearings. As shown in Figure 4, one reduced portion 21 is provided with a conical surface 23 terminating in the shoulder 27 where the rod is increased in diameter. The bottom of the U notch at this end is similarly chamfered round the bottom of the U and widens out at the top of the U so that only the bottom of the U engages the spindle. The reduced portion 21 of the spindle is surrounded by a loose fitting ring 24 with a circumferential groove in its outside and this is engaged by a wire spring 25 extending over the spindle and having its ends engaged under tongues 26 punched and bent out of the ends 11 of the frame.

It will be appreciated that the spring 25 retains the spindle seated in the U-shaped notch in the end 11 and ensures that the engagement of the conical surfaces 23 urges the spindle towards the left and presses the shoulder 27 on the spindle into contact with the corresponding surface of the end 11 of the frame. At the opposite end the reduced surface 22 of the spindle is of plain cylindrical form and the bottom of the U-shaped notch is also of cylindrical form. This end of the spindle is, therefore, free to move endwise and is located as far as endwise movement is concerned by the opposite end 21 of the spindle.

In the case of ganged condenser units, it is often desirable to make electrical connection with the vane spindle at points along the spindle situated between the several banks of condenser vanes.

For this purpose each of the partitions 18 is provided with a shallow notch 30 in one edge. One end of this notch overhangs at 31 while the opposite end is provided with a step 32.

Mounted upon each of the cross-members is a spring contact 33 of sheet metal as shown in Figure 6. This contact consists of a small plate stamped out of resilient sheet metal in the form of a U with a triangular tab 35 projecting from the base of the U. This tab is bent upwardly out of the general plane of the U and constitutes a binding post for a wire connection. The U-shaped contact is also formed with a small tongue 34 projecting into the space between the limbs of the U from the base thereof.

The contact 33 is placed with the base of the U in the shallow notch and the limbs bearing on the spindle on opposite sides of the partition 18. The contact is sprung into position by pressing its middle down into the shallow notch and then moving it bodily towards the spindle. The projection 34 from the fork of the U engages under the overhung end 31 while movement to clear the overhung portion is prevented by the engagement of the rear end of the tongue with the step 32. Moreover, the natural resilience of the tongue prevents the rear end from clearing the step 32. Under these circumstances, the pressure of the limbs of the contact 33 assists the retaining springs 25 in retaining the spindle firmly in its bearings.

It will be appreciated that the condenser described can be made very cheaply since the movable parts can be completely assembled and the stationary parts can be completely assembled before the moving parts are put into the stationary parts. Moreover, the arrangement ensures that any slackness either in a radial direction or in a longitudinal direction is prevented.

We claim—

1. A variable electrical condenser comprising a frame member having a bearing, a movable vane spindle carried in said bearing and having a tapered surface co-operating with a corresponding surface afforded by said bearing and a thrust surface located so as to be pressed into engagement with a corresponding thrust surface carried by the frame member by pressure on said tapered surface in a direction transverse to the length of the spindle, and a resilient retainer to urge the spindle against said bearing in such a direction.

2. A variable electrical condenser comprising a movable vane spindle, a frame having a plate extending transverse to the length of the spindle, a shallow notch in one edge of said plate with its end nearer to the spindle overhanging, and a fork shaped spring contact tongue carried by said plate having its two limbs extending on either side of the plate and bearing upon the spindle and the end of its body adjacent the limbs held in position beneath the overhanging end of the notch.

3. A variable electrical condenser comprising a movable vane spindle, a frame having a plate extending transverse to the length of the spindle, a shallow notch in one edge of said plate with its end nearer to the spindle overhanging, and a fork shaped spring contact tongue whereof the body portion is of the same length as the bottom of the notch and which is mounted therein with its two limbs extending on either side of the plate and bearing upon the spindle and the end of its body adjacent the limbs held in position beneath the overhanging end of the notch and the opposite end of the body abutting against the end of the bottom of the notch.

4. A variable electrical condenser comprising a frame member, a movable vane spindle carried in said frame member and having a tapered surface co-operating with a bearing surface carried by the frame member and a thrust surface located so as to be pressed into engagement with a corresponding thrust surface carried by the frame member by pressure of said tapered surface against its co-operating bearing surface in a direction transverse to the length of the spindle, and means to urge the spindle against said bearing in such a direction.

5. A variable electrical condenser comprising a frame member, a movable vane spindle carried in said frame member and having a tapered surface co-operating with a bearing surface carried by the frame member and a thrust surface located so as to be pressed into engagement with a corresponding thrust surface carried by the frame member by pressure of said tapered surface against its co-operating bearing surface in a direction transverse to the length of the spindle and means engaging the spindle in the region of said tapered surface to urge the latter against its co-operating bearing surface in such a direction.

6. A variable electrical condenser comprising a frame member, a movable vane spindle carried in said frame member and having a tapered surface co-operating with a bearing surface carried by the frame member and a thrust surface located so as to be pressed into engagement with a corresponding thrust surface carried by the frame member by pressure of said tapered surface against its co-operating bearing surface in a direction transverse to the length of the spindle, and a resilient retainer consisting of an elongated spring extending across the spindle between abutments on the frame, held in position by its own resilience, and serving to urge the tapered surface against its co-operating bearing surface in a direction transverse to the length of the spindle.

7. A variable electrical condenser comprising a frame member, a movable vane spindle carried in said frame member and having a tapered surface co-operating with a bearing surface carried by the frame member and a thrust surface located so as to be pressed into engagement with a corresponding thrust surface carried by the frame member by pressure of said tapered surface against its co-operating bearing surface in a direction transverse to the length of the spindle, and a resilient retainer comprising a ring surrounding the spindle and an elongated spring extending across and bearing upon said ring between abutments on the frame member, held in position by its own resilience and serving to urge the tapered surface against its co-operating bearing surface in a direction transverse to the length of the spindle.

In testimony whereof we have signed our names to this specification.

WILLIAM OSCAR HEYNE.
PERCIVAL JAMES PACKMAN.